US005762694A

United States Patent [19]
Yokoi et al.

[11] Patent Number: 5,762,694
[45] Date of Patent: Jun. 9, 1998

[54] INK COMPOSITION FOR MARKING PEN

[75] Inventors: Masakazu Yokoi; Hirofumi Yamasaki; Yasuji Okuda, all of Osaka, Japan

[73] Assignee: Sakura Color Products Corporation, Osaka, Japan

[21] Appl. No.: 708,822

[22] Filed: Sep. 9, 1996

[30] Foreign Application Priority Data

Sep. 8, 1995 [JP] Japan .................................. 7-256992

[51] Int. Cl.$^6$ .................................................. C09D 11/16
[52] U.S. Cl. ...................... 106/31.65; 106/31.67; 106/31.88; 106/31.95
[58] Field of Search .................... 106/31.95, 31.65, 106/31.67, 31.88

[56] References Cited

U.S. PATENT DOCUMENTS

| | | | |
|---|---|---|---|
| 1,752,462 | 4/1930 | Smith | 106/31.65 |
| 4,180,407 | 12/1979 | Gibson et al. | 106/31.69 |
| 4,490,177 | 12/1984 | Shioi et al. | 106/31.65 |
| 4,604,139 | 8/1986 | Shioi et al. | 106/31.58 |
| 4,657,591 | 4/1987 | Shioi et al. | 106/31.58 |
| 5,474,603 | 12/1995 | Miyashita et al. | 106/31.65 |

FOREIGN PATENT DOCUMENTS 57-28176  2/1982  Japan .

*Primary Examiner*—Helene Klemanski
*Attorney, Agent, or Firm*—Armstrong, Westerman, Hattori, McLeland & Naughton

[57] ABSTRACT

An ink composition according to the present invention includes (1) a leafing type fine metal powder having a median particle size of from about 4 μm to about 11 μm, the powder being present in an amount, relative to the total amount of the ink composition, within the range of from about 10% to about 38% by weight, the powder being selected from a copper alloy, aluminum, copper, or zinc whose surface is treated by a saturated fatty acid having 16 to 22 carbon atoms, or salts thereof. The ink composition further includes (2) a petroleum resin having iodine value of not more than 30 (g/100 g), whereby the resin is present in an amount, relative to the total amount of the ink composition, within the range of from about 10% to about 30% by weight; (3) at least two kinds of hydrocarbon solvents, whereby the solvents are present in an amount, relative to the total amount of the ink composition, within the range of from about 32% to about 80% by weight.

17 Claims, No Drawings

INK COMPOSITION FOR MARKING PEN

BACKGROUND OF THE INVENTION

1. Field of the Invention

The present invention relates to an ink composition for use in a marking pen and, more particularly, to a metallic luster ink composition which provides a bright and opacifying handwriting having a metallic luster of gold, silver, copper, red or blue on various written objects, which is free of degeneration and discoloration, appears metallic luster color as if obtained by a fresh ink composition even after long-term storage, and is superior in re-dispersion of metal powder pigment.

2. Description of Related Art

A marking pen typically includes a penholder having an ink container therein, a penpoint attached to the leading end of the penholder, and an ink efflux adjusting equipment which provides an ink from the penholder to the penpoint. Such a penpoint usually is made of; for example, a bundle of fibers, a plastic rod having a penetrating hole, or the like. The ink efflux adjusting equipment employs, for example, an ink feeding mechanism which provides an ink from the ink container to the penpoint through a valve in accordance with a press operation, an ink feeding mechanism which leads an ink from the ink container to the penpoint by way of a helical core, or the like. An ink stirring ball typically is sealed in the ink container, as required.

Conventionally, a metallic luster ink composition for use in a marking pen has been used for obtaining a metallic luster handwriting on a surface of metal, glass, plastic, paper, or the like. Such a conventional ink composition comprises metal deposited plastic foil fractions dispersed in a vehicle including an organic solvent and a resin dissolved therein. However, a handwriting obtained by the above-mentioned ink composition is inferior in metallic luster performance. To improve this performance, so-called leafing-type fine metal powder, each having the shape of a scale surface-treated with a higher fatty acid or its salt to enhance a metallic luster performance, has been used. Japanese Patent Publication (unexamined) No. Hei 1-56109 discloses an ink composition comprising a leafing-type fine metal powder, an organic solvent and a hydrocarbon base resin or a xylene resin dissolved in the solvent. The organic solvent usually is selected from an aromatic hydrocarbon, an aliphatic hydrocarbon, an alicyclic hydrocarbon, a ketone and an ester. The fine metal powder typically is selected from aluminum, copper, zinc and copper alloy, each surface-treated with a fatty acid such as palmitic acid, stearic acid, oleic acid, or the like.

Japanese Patent Publication (unexamined) No. Hei 1-56109 discloses a metallic luster ink composition comprising a leafing-type fine metal powder, a solution for dispersing the powder, a rust-preventive agents and a dispersant. The solution is that an alkyl phenol denatured xylene resin, xylene resin or a petroleum resin is dissolved in the mixture of a mineral spirit or a xylol of an aromatic base solvent and an isobutyl ketone, a n-hexane or a methylcyclohexane. The handwriting obtained by the ink has a bright and reflective metallic luster color. However, when the ink is kept in the marking pen for a long period, for example, for more than three months, the handwriting obtained by the ink sometimes exhibits less reflective and a simple metallic color with no metallic luster, compared to a handwriting obtained by a fresh ink.

Thus, the conventional ink including a leafing-type fine metal powder results in inferior quality after long-term storage. Further, the ink suffers in re-dispersion of the metal powder.

SUMMARY OF THE INVENTION

In view of the foregoing disadvantages that are inherent in conventional ink composition, the present invention aims to solving the above problems of an ink composition for use in marking pen.

Hence, it is an object of the present invention to provide an ink composition for use in a marking pen which is free of degeneration and discoloration and can obtain a clear and reflective handwriting having a metallic luster of gold, silver, copper, or the like, on various written objects as if obtained by a fresh ink even after long-term storage. It further is an object to provide an ink composition that is superior in re-dispersion of metal powder.

In accordance with these and other object of the present invention, there is provided an ink composition comprising:

(1) leafing-type fine metal powder having a median particle size of from about 4 μm to about 11 μm, the powder being present in an amount, relative to the total amount of the ink composition, within the range of from about 10% to about 38% by weight, the powder being selected from a copper alloy, aluminum, copper, or zinc whereby each surface is treated with a saturated fatty acid having 16 to 22 carbon atoms, or salts thereof;

(2) a petroleum resin having an iodine value of not more than 30 (g/100 g), the resin being present in an amount, relative to the total amount of the ink composition, within the range of from about 10% to about 30% by weight;

(3) at least two kinds of hydrocarbon solvents, the solvents being present in an amount, relative to the total amount of the ink composition, within the range of from about 32% to about 80% by weight.

The ink composition may further comprise (4) a pigment, a fatty dye, a rust-preventive agent, a leafing type additive agent and a pigment dispersant.

These and other objects of the present invention will be readily apparent to those skilled in the art upon review of the detailed description which follows.

DETAILED DESCRIPTION OF THE PREFERRED EMBODIMENTS

Usually, any leafing type fine metal powder can be used so long as it achieves the foregoing objects of the invention.

Preferably, a leafing type fine metal powder having a median particle size of from about 4 μm to about 11 μm can be used in the present invention. The surface of the metal powder may be treated with a saturated fatty acid such as palmic acid, stearic acid and the like each having 16–22 carbon atoms, or salts or mixtures thereof. The leafing type fine metal powder typically is distributed in an ink composition so that the powder preferably is condensed on a surface of handwriting and thus metallic luster is obtained by the increased reflection property of the handwriting.

As petroleum resins used in the present invention, an aromatic base petroleum resin and an aliphatic base resin made of a by-product from petroleum cracking, or a hydrogenation petroleum resin preferably can be used. The hydrogenation petroleum resin can be obtained by adding hydrogen to a petroleum resin polymerized with an acidic catalyst based on a higher unsaturated hydrocarbon. The chemical structure of the petroleum resin is complex, and a saturated hydrocarbon ring usually is pendent to a long chain on an aliphatic saturated hydrocarbon chain in almost all of the structures.

It is said that some of the carbon-carbon bonds of the aromatic base resin and the aliphatic base resin are unsaturated. Though the unsaturated bond content depends on the amount of the hydrogenation petroleum resin, a petroleum resin having fairly low content of the unsaturated bond is preferably used.

The reason for using the petroleum resin having fairly low content of the unsaturated bond is as follows. When a leafing-type fine metal powder and a petroleum resin having a high iodine value, i.e., a petroleum resin having a fairly high content of unsaturated bonds, are used as compositions of a metallic luster ink, it is conceivable that electrons transfer at the double bond among the fine metal powder and between a saturated fatty acid and a resin. Thus, oxidation of metal powder and/or lost of leafing occurs, resulting in deterioration of metallic luster color and change in color.

To prevent the deterioration and change of metallic luster color, when a saturated petroleum resin added to hydrogen is used, an ink composition which is preventive of change in quality and color can be made, because it was found that in the unsaturated bonds in a resin, the fine metal powder electrons that may transfer at the double bond between the fine metal powder and a saturated fatty acid, may be reduced. As a result of an intensive study of the minimum limit amount of double bonds which have this effect in practice, it was found that an iodine value preferably is not more than 30 (g/100 g). Thus, the iodine value is reduced to not greater than 30 (g/100 g), more preferably to not greater than 15 (g/100 g). In practice, the iodine value is from 0 to 30 (g/100 g), preferably from 0 to 15 (g/100 g). The iodine value can be controlled by the amount of hydrogenation, and these skilled in the art are capable of controlling the iodine content using the guidelines provided herein.

As aromatic base petroleum resin, styrene, α-methyl styrene, copolymers of vinyl toluene and α-methyl styrene preferably are used. The iodine value thereof is preferably reduced to not greater than 15 (g/100 g), more preferably reduced within the range of from 0 to 10 (g/100 g), and most preferably reduced within the range of from 0 to 5 (g/100 g). As an aromatic base petroleum resin, a resin obtained by polymers of high purity is preferably used. When styrene is used, a compound having styrene base is the most preferable, which has a molecular weight lower than general polystyrene thereof, more particularly, a molecular weight within the range of 300–1000, and has an iodine value which is controlled to within the range of from 0 to 10(g/100 g). For example, PICCOLASTIC A5 (brand name) made by RIKA-HERCULES INC. or PICCOLASTIC 75 (brand name) made by RIKA-HERCULES INC. is preferably used.

When α-methyl styrene is used, the compound having a molecular weight within the range of 600–1100 is preferable. More preferably, the compound having an iodine value of 0–5(g/100 g) is used. For example, KLISTALEX 3085 (brand name) made by RIKA-HERCULES INC. or KLISTALEX 3100 (brand name) made by RIKA-HERCULES INC. is preferably used.

When a copolymer of vinyl toluene and α-methyl styrene is used, the compound having a molecular weight within the range of 900–4000 is preferably used. More preferably, a compound having an iodine value of 0 to 5 (g/100 g) is used. For example, PICCOTEX LC (brand name) made by RIKA-HERCULES INC. preferably is used.

On the other hand, when the marking pen filled with the above described luster color ink is left for a period of time, the fine metal powder dispersed in the organic solvent will deposit. Therefore, shaking the marking pen is required for stirring the ink and redispersing the deposited fine powder by using the ball in the ink container. However, the long-term storage deteriorates the re-dispersion.

Therefore, to improve this re-dispersion, a mixture of more than two different solvents can be used in the present invention. When the ratio of the solvent weight of the solvent having a higher vapor pressure to the solvent weight of the solvent having a lower vapor pressure falls within the range of from 25:100 to 400:100, convection of the solvents is enhanced to suppress sedimentation of the leafing-type fine metal powder. As a result, the formation of undissolved lumps is avoided and re-dispersion of the powder is improved.

When one solvent, or two or more solvents having ratios out of the above-mentioned ranges are used, the fine metal powder sediments and is liable to form undissolved lumps.

The mixing amounts of the leafing-type metal powder to the total amount of the ink composition preferably should fall within the range of from about 10 to about 38% by weight, more preferably from about 31 to about 35% by weight. If the amount of the fine metal powder to that of the ink composition is less than 10% by weight, the handwriting will look weak, or will be inferior in opacifying effect. On the other hand, if the amount of the fine metal powder to that of the ink composition exceeds 38% by weight, the ink will flow with difficulty, or will solidify after long-term storage.

The mixing amount of petroleum resins relative to the total amount of ink composition preferably should fall within the range of from about 10 to about 30% by weight, more preferably from about 15 to about 27% by weight. If the mixing amount of petroleum resins relative to the total amount of the ink composition is less than 10% by weight, the re-dispersion will be reduced during the storage, and the handwriting will have less metallic luster and fade out because of losing adhesive quality to written objects. On the other hand, if the mixing amount of petroleum resins relative to that of the ink composition exceeds 30% by weight, the ink will flow with difficulty because of increased ink viscosity.

The amount of solvent relative to the total amount of the ink composition preferably should fall within the range of from about 32 to about 80% by weight. If the amount of solvent relative to the total amount of the ink composition is less than 32%, an ink will flow with difficulty or may solidify after long-term storage. If the amount of solvent relative to that of the ink composition exceeds 80% by weight, the handwriting likely will look weak or will be inferior in opacifying effect. The amount of solvent relative to the total amount of the ink composition depends on the resin dissolving power of the solvent and its vapor pressure. If a solvent of alicyclic saturated hydrocarbon series is used, the amount thereof preferably is 40%–60% by weight.

Additives such as a fatty dye, a rust-preventive agent, a leafing-type additive agent, a pigment dispersant, or the like, a pigment and a colorant which dissolve in the above-mentioned solvents may be added to the ink composition.

Those skilled in the art are capable of adding these additives depending upon the intended application properties desired of the ink composition.

The invention now will be explained by reference to particularly preferred embodiments as illustrated in the following non-limiting examples.

EXAMPLES

According to the weight ratio shown in tables 1 and 2, a resin was added to a solvent and dissolved therein by stirring at a temperature of 50° C. After the resultant solution was cooled to room temperature, a fine metal powder was added to the solution. Metallic luster ink compositions for use in a marking pen were obtained after the resultant mixture was stirred for dispersion. By using marking pens filled with the metallic luster ink compositions, prepared above, hand writings were obtained by these ink compositions when used in marking pens. A metallic luster of hand writing after short-time storage, a metallic luster of hand writing after long-term storage and a re-dispersion after long-term storage were evaluated, and the test results are shown in Table 1 and 2.

The marking pens used in the examples are the assemblages of PAINT MARKER HOSOJI (brand name) made by SAKURA COLOR PRODUCTS CORPORATION.

These marking pens have a penholder having an ink container inside, a penpoint attached to the end of the penholder, and an ink efflux adjusting equipment which provides an ink from the penholder to the penpoint. This ink efflux adjusting equipment includes a mechanism which provides an ink from the ink container to the penholder through a valve corresponding to a press operation. And, a stirring hard ball is sealed in the ink container.

The details of mixture used in Tables 1 and 2 are shown as follows.

(1) SUPER 300: made by ECKART-WERKE, STANDART BRONZE POWDER SUPER 3000 RICHGOLD (surface treated with stearic acid, median particle size is 4 μm; fine copper alloy powder of leafing type).

(2) ROTOFLEX: made by ECKART-WERKE, STANDART BRONZE POWDER ROTOFLEX RICHGOLD (surface treated with stearic acid, median particle size is 5 μm; fine copper alloy powder of leafing type).

(3) RESIST ROTOFLEX: made by ECKART-WERKE, STANDART BRONZE POWDER RESIST ROTOFLEX RICHGOLD (surface treated with stearic acid, median particle size is 4 μm; fine copper alloy powder of non-leafing type).

(4) CHROMAL X: made by ECKART-WERKE, STANDART ALUMINUM POWDER CHROMAL X (surface treated with stearic acid, median particle size is 9 μm; fine aluminum powder of leafing type).

(5) ALPASTE 1230M : made by TOYO ALUMINUM K.K.A1230 (surface treated with palmitic acid, median particle size is 10 μm; Fine copper aluminum powder of non-leafing type).

(6) MARUKAREZ H925: made by MARUZEN PETROCHEMICAL COMPANY, LIMITED MARUKAREZ H925 (Petroleum resin. The iodine value is 10 (g/100 g)).

(7) MARUKAREZ H505: made by MARUZEN PETROCHEMICAL COMPANY, LIMITED MARUKAREZ H505 (Petroleum resin. The iodine value is 30 (g/100 g)).

(8) NEOPOLYMER 170S: made by NIPPON OIL COMPANY, NISSEKI NEOPOLYMER 170S (Petroleum resins. The iodine value is 47 (g/100 g)).

(9) MARUKAREZ M845: made by MARUZEN PETROCHEMICAL COMPANY, LIMITED, MARUKAREZ M845 (Alicyclic hydrocarbon resin. The iodine value is 190 (g/100 g)).

(10) MARUKAREZ S100A: made by MARUZEN PETROCHEMICAL COMPANY, LIMITED, MARUKAREZ S100A (Aliphatic hydrocarbon resin. The iodine value is 150 (g/100 g)).

(11) REGALITE R-90: made by RIKA-HERCULES INC. REGALITE R-90 (Alicyclic hydrocarbon resin. The iodine value is less than 1.6 (g/100 g)).

(12) PICCOLASTIC A75: made by RIKA-HERCULES INC. PICCOLASTIC A75 (Styrene resin. The iodine value is 3.2(g/100 g)).

(13) PICCOTEX: made by RIKA-HERCULES INC. PICCOTEX (Copolymer of Vinyl toluene and α-methyl styrene. The iodine value is 3.2 (g/100 g)).

(14) KLISTALEX 3085: made by RIKA-HERCULES INC. KLISTALEX 3085 (Copolymer of Vinyl toluene and α-methyl styrene. The iodine value is 3.2(g/100 g)).

(15) MCH: made by MARUZEN PETROCHEMICAL COMPANY, LIMITED (Methylcyclohexane vapor pressure at 22.0° C. is 44 mmHg. Alicyclic hydrocarbon resin solvent).

(16) ECH: made by MARUZEN PETROCHEMICAL COMPANY, LIMITED (Ethylcyclohexane vapor pressure at 20.6° C. is 10 mmHg. Alicyclic hydrocarbon resin solvent).

"Initial metallic luster" was evaluated from the handwriting on a black art paper. The handwriting was obtained on the day when the ink was sealed in the marking pen. The critera are as follows.

Evaluation A: Initial metallic luster reached the level expected.

Evaluation B: Initial metallic luster did not reach the level expected, however it was fairly good.

Evaluation C: Initial metallic luster did not reach the level expected.

"Metallic luster after long-term storage" was evaluated from the handwriting on black art paper. The criteria are the same as mentioned above. The ink was sealed in a marking pen, and the pen was stored at the temperature of 50° C. for one month. Then, the pen was shaken for re-despersing the deposited fine metallic powder by using the ball in the ink container. The criteria for evaluating the ink are as follows.

Evaluation A: Initial metallic luster reached the level expected.

Evaluation B: Initial metallic luster did not reach the level expected, however it was fairly good.

Evaluation C: Initial metallic luster did not reach the level expected.

"Re-dispersion" was estimated from the number of times of shaking a marking pen, which had been stored at the temperature of 50° C. for one month, to enable to move a hard ball in the ink container for re-dispersing the fine metal powder. The criteria are as follows.

Evaluation A: The number of times of shaking a pen is not more than 10.

Evaluation B: The number of times of shaking a pen exceeds 10.

TABLE 1

| Material Used in Ink Composition | | EXAMPLE NO. | | | | | | | | |
|---|---|---|---|---|---|---|---|---|---|---|
| | | 1 | 2 | 3 | 4 | 5 | 6 | 7 | 8 | 9 |
| METAL POWDER | SUPER 3000 [1] | 33 | | | 20 | | 30 | | | 28 |
| | ROTOFLEX [2] | | 11 | | 16 | | | 25 | | |
| | RESIST ROTOFLEX [3] | | | | | | | | | |
| | CHROMAL X [4] | | | 16 | | 30 | | | 20 | |
| | ALPASTE 1230 M [5] | | | | | | | | | |
| | MARUKAREZ H-925 [6] | 14 | 23 | | 12 | | | | | |

TABLE 1-continued

| Material Used in Ink Composition | | EXAMPLE NO. | | | | | | | | |
|---|---|---|---|---|---|---|---|---|---|---|
| | | 1 | 2 | 3 | 4 | 5 | 6 | 7 | 8 | 9 |
| RESIN | MARUKAREZ H-505 [7] | 26 | 15 | 16 | | | | | | |
| | REGALITE R-90 [11] | | | | | | 28 | | | |
| | PICCOLASTIC A75 [12] | | | | | | | 25 | | |
| | PICCOTEX LC [13] | | | | | | | | 20 | |
| | KRISTALEX 3085 [14] | | | | | | | | | 30 |
| SOL-VENT | MCH [15] | 11 | 30 | 45 | 28 | 28 | 20 | 10 | 35 | 26 |
| | ECH [16] | 30 | 30 | 16 | 20 | 30 | 22 | 40 | 25 | 16 |
| EVALU-ATION | Initial metallic luster | A | A | A | A | A | A | A | A | A |
| | Metallic luster after long-term storage | A | A | A | A | A | A | A | A | A |
| | Re-dispersion after long-term storage | A | A | A | A | A | A | A | A | A |

TABLE 2

| Material Used in Ink Composition | | COMPARATIVE EXAMPLE NO. | | | | | | | | |
|---|---|---|---|---|---|---|---|---|---|---|
| | NO. | 1 | 2 | 3 | 4 | 5 | 6 | 7 | 8 | 9 |
| METAL POWDER | SUPER 3000 [1] | 33 | | | | 33 | | | | 20 |
| | ROTOFLEX(2) | | 11 | | | | | 11 | | 16 |
| | RESIST ROTOFLEX(3) | | | 36 | | | | | | |
| | CHROMAL X(4) | | | 16 | | | | 16 | | |
| | ALPASTE 1230 M(5) | | | | 30 | | | | | |
| | MARUKAREZ H-925 [6] | | | | 12 | | 14 | 23 | | |
| RESIN | MARUKAREZ H-505 [7] | | | 16 | | 26 | 15 | | 16 | |
| | NEOPOLYMER 170 S [8] | 26 | 23 | | | | | | | |
| | MARUKAREZ M-845 [9] | | 14 | | | | | | | |
| | MARUKAREZ S-100 A [10] | | 15 | | | | | | | |
| SOLV-VENT | MCH [15] | 11 | 30 | 45 | 28 | 28 | 41 | | 5 | 40 |
| | ECH [16] | 30 | 30 | 16 | 20 | 30 | | 60 | 56 | 8 |
| EVALU-ATION | Initial metallic luster | A | A | A | C | C | A | A | A | A |
| | Metallic luster after long-term storage | B | C | B | C | C | A | A | A | A |
| | Re-dispersion after long-term storage | A | A | A | A | C | C | C | C | C |

As can be seen from the foregoing results given above, in the comparative Examples 1, 2, and 3 which use a petroleum resin having an iodine value of not less than 30 (g/100 g), the initial metallic luster is fairly good, however, the metallic luster after long-term storage is poor. In the comparative Example 2 which uses MARUKAREZ MB45 having iodine value of 190 (g/100 g), the metallic luster after long-term storage is fairly poor.

In comparative Examples 4 and 5 which use a non-leafing type fine metal powder, the initial metallic luster is poor. In comparative Examples 6 and 7 which use only one solvent, the re-dispersion after long-term storage is poor. In comparative Examples 8 and 9 which use two kinds of solvents whereby the ratio of the solvent having the higher vapor pressure to the solvent having the lower vapor pressure is outside the range of from 25:100 to 400:100, the re-dispersion after long-term storage is poor.

On the other hand, in all Examples according to the present invention, both the initial metallic luster and the metallic luster after long-term storage are good. In addition re-dispersion after long-term storage was good.

It is understood from the above that the ink composition for use in marking pen according to the present invention is free of degeneration and discoloration and can obtain a clear and reflective handwriting having metallic luster as if obtained by a fresh ink even after long-term storage and is superior in re-dispersion of metal powder. While the invention has been described in detail with reference to particularly preferred embodiments and examples, those skilled in the art will appreciate that various modifications can be made to the invention without departing from the spirit and scope thereof.

What is claimed is:

1. A metallic luster ink composition for use in a marking pen, comprising:

(1) a leafing fine metal powder having a median particle size of from about 4 μm to about 11 μm, the powder being present in an amount, relative to the total amount of the ink composition, within the range of from about 10% to about 38% by weight, the fine metal powder being selected from one or more of the group consisting of a copper alloy, aluminum, copper, or zinc, whereby each powder is surface treated with a saturated fatty acid having 16 to 22 carbon atoms, or salt thereof;

(2) a petroleum resin having an iodine value of not more than 30 (g/100 g), the resin being present in an amount, relative to the total amount of the ink composition, within the range of from about 10% to about 30% by weight; and (3) at least two hydrocarbon solvents having different vapor pressures, the solvents being present in an amount, relative to the total amount of the ink composition, within the range of from about 32% to about 80% by weight.

2. A metallic luster ink composition as claimed in claim 1, further comprising at least one additive selected from the group consisting of a pigment, a fatty dye, a rust-preventive agent, a leafing type additive agent and a pigment dispersant.

3. A metallic luster ink composition as claimed in claim 1, wherein said petroleum resin has an iodine value of from 0 to 15.

4. A metallic luster ink composition as claimed in claim 1, wherein said at least two hydrocarbon solvents have different vapor pressure.

5. A metallic luster ink composition as claimed in claim 4, wherein the ratio of said hydrocarbon solvent having the higher vapor pressure to the hydrocarbon solvent having the lower vapor pressure falls within the range of from 25:100 to 400:100.

6. A metallic luster ink composition as claimed in claim 1, wherein said hydrocarbon solvent is an alicyclic saturated hydrocarbon solvent.

7. A metallic luster ink composition as claimed in claim 1, wherein said at least two hydrocarbon solvents are selected from methylcyclohexane and ethylcyclohexane.

8. A metallic luster ink composition as claimed in claim 1, wherein said leafing-type fine metal powder is a copper alloy.

9. A metallic luster ink composition as claimed in claim 1, wherein said leafing fine metal powder is aluminium.

10. A metallic luster ink composition as claimed in claim 1, wherein said leafing fine metal powder is copper.

11. A metallic luster ink composition as claimed in claim 1, wherein said leafing fine metal powder is zinc.

12. A metallic luster ink composition as claimed in claim 1, wherein said petroleum resin is selected from the group consisting of styrene, α-methyl styrene, copolymers of vinyl toluene and α methyl styrene, and mixtures thereof.

13. A metallic luster ink composition as claimed in claim 12, wherein said petroleum resin is styrene having a molecular weight within the range of from 300 to 1000.

14. A metallic luster ink composition as claimed in claim 12, wherein said petroleum resin is α methyl styrene having a molecular weight within the range of from 600–1100.

15. A metallic luster ink composition as claimed in claim 12, wherein said petroleum resin is a copolymer of vinyl toluene and α methyl styrene having a molecular weight within the range of from 900–4000.

16. A metallic luster ink composition as claimed in claim 1, wherein said leafing metal powder is present in an amount within the range of from 31% to 38% by weight.

17. A metallic luster ink composition as claimed in claim 1, wherein said petroleum resin is present in an amount within the range of from 15% to 27% by weight.

* * * * *